(12) United States Patent
Bishop (10) Patent No.: US 6,788,190 B2
(45) Date of Patent: Sep. 7, 2004

(54) TRAILER HITCH MOUNT FOR VEHICLE BACKUP SENSOR

(75) Inventor: Hugh Bishop, Bedford, NH (US)

(73) Assignee: Sense Technologies, Inc., Grand Island, NE (US)

( * ) Notice: Subject to any disclaimer, the term of this patent is extended or adjusted under 35 U.S.C. 154(b) by 53 days.

(21) Appl. No.: 09/994,925

(22) Filed: Nov. 28, 2001

(65) Prior Publication Data

US 2003/0098786 A1 May 29, 2003

(51) Int. Cl.[7] .............................. B60Q 1/00; B60R 11/00
(52) U.S. Cl. ...................... 340/435; 340/436; 340/431; 340/903; 340/686.1; 340/687; 307/9.1; 455/90.3; 455/575.9; 224/519; 280/507
(58) Field of Search ............................... 340/435, 436, 340/431, 903, 686.1, 687; 342/70–72, 23, 24, 9, 457; 280/14, 504, 507, 292; 455/90, 99, 575, 575.8, 575.9, 90.3; 307/10.8, 9.1; 303/1, 123; 362/506, 485, 806; 40/491; 224/511, 519

(56) References Cited

U.S. PATENT DOCUMENTS

| | | | |
|---|---|---|---|
| 3,226,673 A | 12/1965 | Cudworth | 340/904 |
| 3,514,610 A | 5/1970 | Huston et al. | 250/206 |
| 3,924,257 A * | 12/1975 | Roberts | 340/431 |
| 4,260,980 A | 4/1981 | Bates | 340/904 |
| 4,278,962 A | 7/1981 | Lin | 367/909 |
| 4,300,116 A | 11/1981 | Stahovec | 340/562 |
| 4,383,238 A | 5/1983 | Endo | 340/901 |
| 4,937,796 A | 6/1990 | Tendler | 367/116 |
| 4,988,116 A * | 1/1991 | Evertsen | 280/477 |
| 5,173,881 A | 12/1992 | Sindle | 367/909 |
| 5,229,975 A | 7/1993 | Truesdell et al. | 367/107 |
| 5,250,945 A | 10/1993 | Dombrowski | 340/901 |
| RE34,773 E | 11/1994 | Dombrowski | 340/904 |
| 5,453,740 A | 9/1995 | Gallagher et al. | 340/903 |
| 5,455,557 A * | 10/1995 | Noll et al. | 340/431 |
| 5,495,243 A | 2/1996 | McKenna | 340/902 |
| 5,495,252 A | 2/1996 | Adler | 342/127 |
| 5,729,194 A * | 3/1998 | Spears et al. | 340/431 |
| 5,760,708 A | 6/1998 | Seith | 340/903 |
| 5,841,367 A | 11/1998 | Giovanni | 340/903 |
| 5,861,814 A * | 1/1999 | Clayton | 340/687 |
| 5,914,652 A | 6/1999 | Adamo | 340/903 |
| 6,064,299 A | 5/2000 | Lesesky et al. | 340/431 |
| 6,072,173 A | 6/2000 | Soshi et al. | 340/435 |
| 6,087,928 A | 7/2000 | Kleinberg et al. | 340/436 |

FOREIGN PATENT DOCUMENTS

| | | |
|---|---|---|
| DE | 43 34 859 A1 | 12/1994 |
| DE | 197 32 044 A1 | 2/1999 |
| WO | WO 99/42856 | 8/1999 |

\* cited by examiner

Primary Examiner—Donnie L. Crosland
(74) Attorney, Agent, or Firm—Nixon & Vanderhye P.C.

(57) ABSTRACT

An object detection system is mounted at the rear of a vehicle the trailer receiver for the vehicle. The object detection system warns the driver of the vehicle of persons or objects behind the vehicle, when the vehicle is moving backwards. The system emits microwaves rearwardly of the vehicle and senses microwave reflected from objects behind the vehicle. The microwave transceiver is mounted in the trailer receiver in place of the trailer ball that is normally mounted in the receiver.

7 Claims, 10 Drawing Sheets

TRAILER HITCH MOUNT FOR VEHICLE BACKUP SENSOR

FIELD OF THE INVENTION

The invention relates to vehicular warning systems, and more particularly, to devices mountable on a motor vehicle for warning the vehicle operator of obstructions and potential collisions. Still more particularly, this invention relates to a mount for attaching a vehicular warning sensor on a trailer hitch mount of a vehicle.

BACKGROUND AND SUMMARY OF THE INVENTION

Vehicle backup obstacle detection and collision warning systems are useful in preventing accidents and injuries. The need for an effective backup system is evident when one considers the amount of damage low-speed backing collisions cause each year. Such collisions translate into major repair bills, countless injuries and even worse, fatalities.

A system called GUARDIAN ALERT™, that has been marketed and manufactured by Sense Technologies, Inc., is capable of warning a driver of the presence of objects within a defined area behind the vehicle when the vehicle is engaged in reverse gear. The GUARDIAN ALERT™ system employs a microwave radar technology, and applies the Doppler shift principle to detect the presence of a moving target within a certain defined range to the rear of the vehicle. This system includes dual alarms that alert drivers audibly and visually with three light-emitting diode style-illuminating lights. The system provides various detection zones behind the vehicle that are factory-adjustable, and covers the entire width of the vehicle. For example, detection zones for heavy trucks may extend twelve feet, six feet and/or three feet (12-6-3 feet) behind the truck. Similarly, detection zones for delivery vans may be 9-5-3 feet, and non-commercial passenger vehicles may have detection zones of 8-4-2 feet.

The system works in all weather and light conditions. It senses through dirt, ice, snow, fog and other weather conditions and requires low or no maintenance. The system is active when the vehicle is placed in reverse (and may be active only when in reverse to eliminate annoying false alarms). Such systems provide advantages such as non-contact sensing, environmental insensitivity, low cost, and the ability to "see through" composites such as fiberglass vehicle bodies. See, for example, U.S. Pat. No. RE34,773; U.S. Pat. No. 4,797,673; U.S. Pat. No. 4,864,298; and U.S. Pat. No. 5,028,920.

The GUARDIAN ALERT™ system has proven to be effective in dramatically increasing vehicle safety. However, further improvements are possible. An area of desired improvement relates to the adaptability of a backup warning system to a number of different vehicle styles. All sorts of different vehicles (for example, passenger cars, light trucks, sports utility vehicles, heavy trucks, and any other type of vehicle) can benefit from a backup warning system.

The present invention satisfies this need, at least for vehicles having a standard trailer receiver for a trailer ball. A mount has been developed for the warning sensor of the GUARDIAN ALERT™ system that fits virtually all types of personal vehicles, provided that the vehicle has a conventional trailer receiver. Trailer receivers are attached to the rear of the frame of a vehicle. They are used for mounting trailer balls which hitch to a trailer, such as a mobile home trailer, horse trailer, open-bed trailer, etc. When the trailer ball is not inserted in the receiver, the trailer receiver is normally empty or is covered with a cap. The cap may be a decorative ornament, such as an ornamental boat propeller or an auxiliary back-up light.

The trailer receiver generally includes a hollow metal beam having a rear aperture to receive a trailer ball. The rear aperture is generally square or rectangular in cross-section. These vehicles with trailer receivers tend to be sports-utility-vehicles (SUVs), pickup trucks, vans, mini-vans and full sized sedans. However, the warning mount is suitable to any vehicle having a conventional trailer receiver hitch.

It is counter-intuitive to attach a warning sensor to a hitch mount, because the sensor will prevent the hitch from receiving a trailer plug or hitching to a trailer. However, a backup warning sensor is not usable when on the rear of a vehicle that is towing a trailer because the sensor's field of view is blocked by the trailer. Moreover, the sensor hitch mount disclosed here is easily removed from the hitch so that a trailer plug can be inserted into the hitch for towing a trailer. Accordingly, mounting a warning sensor in a trailer receiver is a novel, unobvious and useful design.

In one embodiment, the invention is a warning sensor system for a vehicle comprising: a sensor head mountable in an aperture of a trailer receiver attached to a rear of the vehicle, wherein said sensor head includes a transceiver emitting wireless signals rearwardly of the vehicle and detecting echoes from the signals reflected from an object behind the vehicle; an electrical coupling connected to the sensor head and connectable to a matching coupling on said receiver; and an alarm device mounted in a passenger compartment of said vehicle and electrically connected to said sensor head.

BRIEF DESCRIPTION OF THE DRAWINGS

These and other features and advantages provided by the invention will be better and more completely understood by referring to the following detailed description of presently preferred example embodiments in connection with the drawings, of which.

DETAILED DESCRIPTION OF PRESENTLY PREFERRED EXEMPLARY EMBODIMENTS

Figure 1:
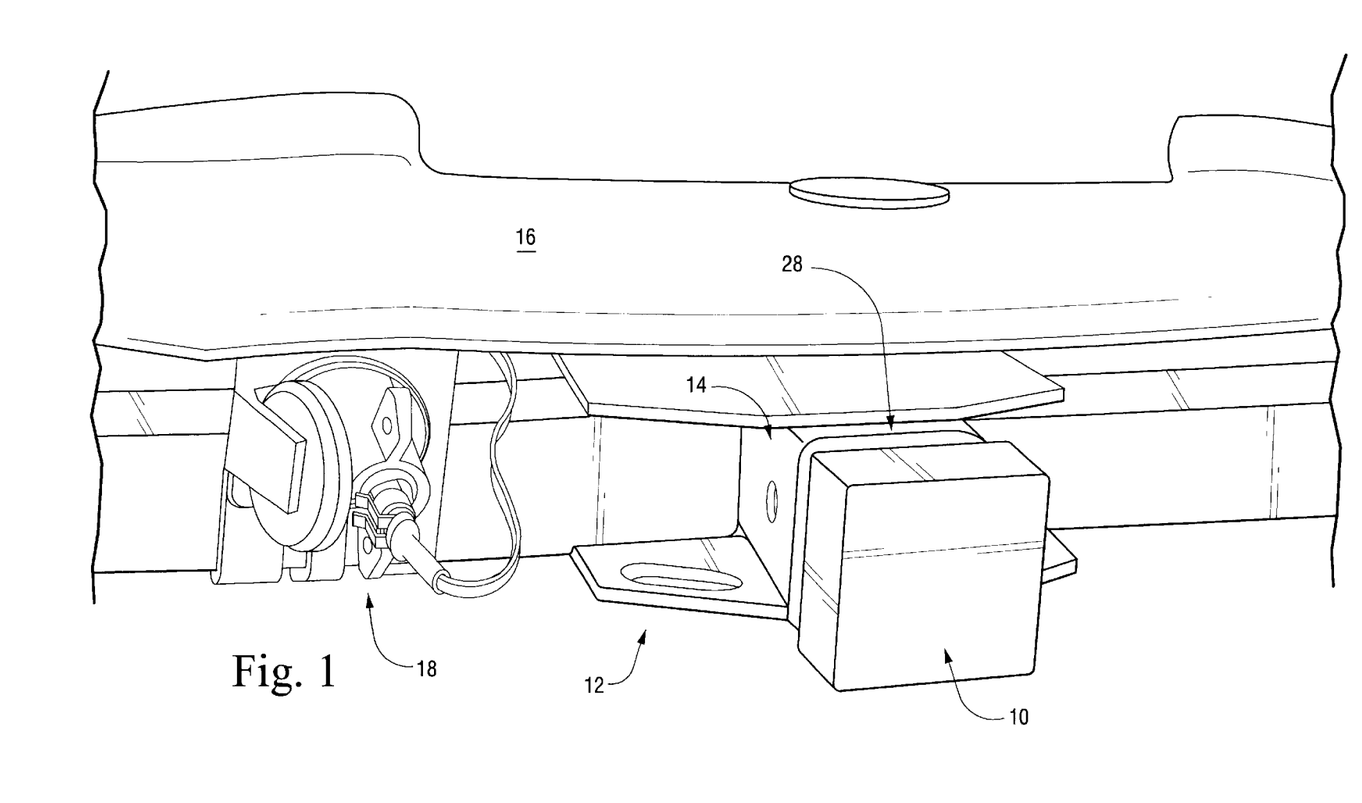
FIG. 1 is a perspective view of a warning sensor mounted on a trailer receiver of a vehicle.

FIG. 1 is a perspective view of sensor head 10 of a backup warning system 12 mounted on a trailer receiver 14 on the rear of a vehicle 16. The sensor includes a mounting bracket that slides into a receiver 14 attached to the rear of the trailer hitch. The sensor mounting bracket is inserted into an open rear aperture of the trailer receiver. There is no trailer ball inserted in the receiver, while the sensor head is in the receiver. Thus, the sensor head 10 is mounted in the trailer receiver instead of the usual trailer ball for which the trailer hitch is designed.

The sensor head may be removed and detached from the trailer receiver, so that a trailer hitch plug may be inserted into the receiver. Accordingly, the sensor head may be installed in the trailer receiver and operate as a backup warning system. Alternatively, the sensor head may be removed and a trailer ball may be inserted in the receiver so that the vehicle may be used for towing purposes.

The sensor head 10 houses a transceiver sensor 17 that emits electromagnetic waves, e.g., microwaves or radio frequency (RF) waves, (or other types of waves, e.g., ultrasonic waves) rearward of the vehicle. These waves reflect off objects that are behind the rear of the vehicle, such as within a 12 to 20 feet of the rear bumper of the vehicle. The reflections of these waves are detected by the transceiver 17 of the sensor head 10, which causes an alarm to sound or be emitted to warn the driver of the vehicle of the object behind the vehicle.

It is generally preferable for the transceiver sensor head 10 to be positioned on the rear of a vehicle, along the centerline vehicle and facing rearwardly of the vehicle. Conveniently, trailer receivers are generally mounted along the center of the vehicle, have an aperture 28 facing rearward and extend just below the rear bumper. Most of the trailer receivers 14 are a standard size, and present an open square or rectangular aperture 28, which is suitable for receiving the mounting bracket 24 for the sensor head 10. Standard sized trailer receivers (class 1–3) in the United States are two (2") inches square in cross section, except for the 1¼" (inch) receiver used on some minivan vehicles. Similarly, with the exception of a few commercial vehicles, (that may have class V 2-½" receivers), all receivers have open apertures that are designed to receive a trailer ball attachment. The open apertures 28 of a trailer receiver can be used to receive the mounting bracket 24 and thereby support the sensor head 10 on the rear of the vehicle.

In addition, a standard electrical wiring socket 18 is generally nearby and associated with the trailer receiver. For example, a 7-pole RV (recreational vehicle) blade plug connector 30 has become an industry standard in the United States. This standard electrical plug 30 may be used to couple the warning system 12 to the vehicle electrical system. This coupling is needed to provide power from the vehicle electrical system to the warning system. In addition, the connection provides the electrical backup signal from the vehicle to activate the warning system. In particular, the electrical wiring socket generally has an electrical contact that becomes active, e.g., power is applied, when the vehicle's transmission is switched to reverse mode, i.e., backup mode. By coupling to this electrical contact, the warning system 12 can be automatically activated when the vehicle is in backup mode.

Figure 2:
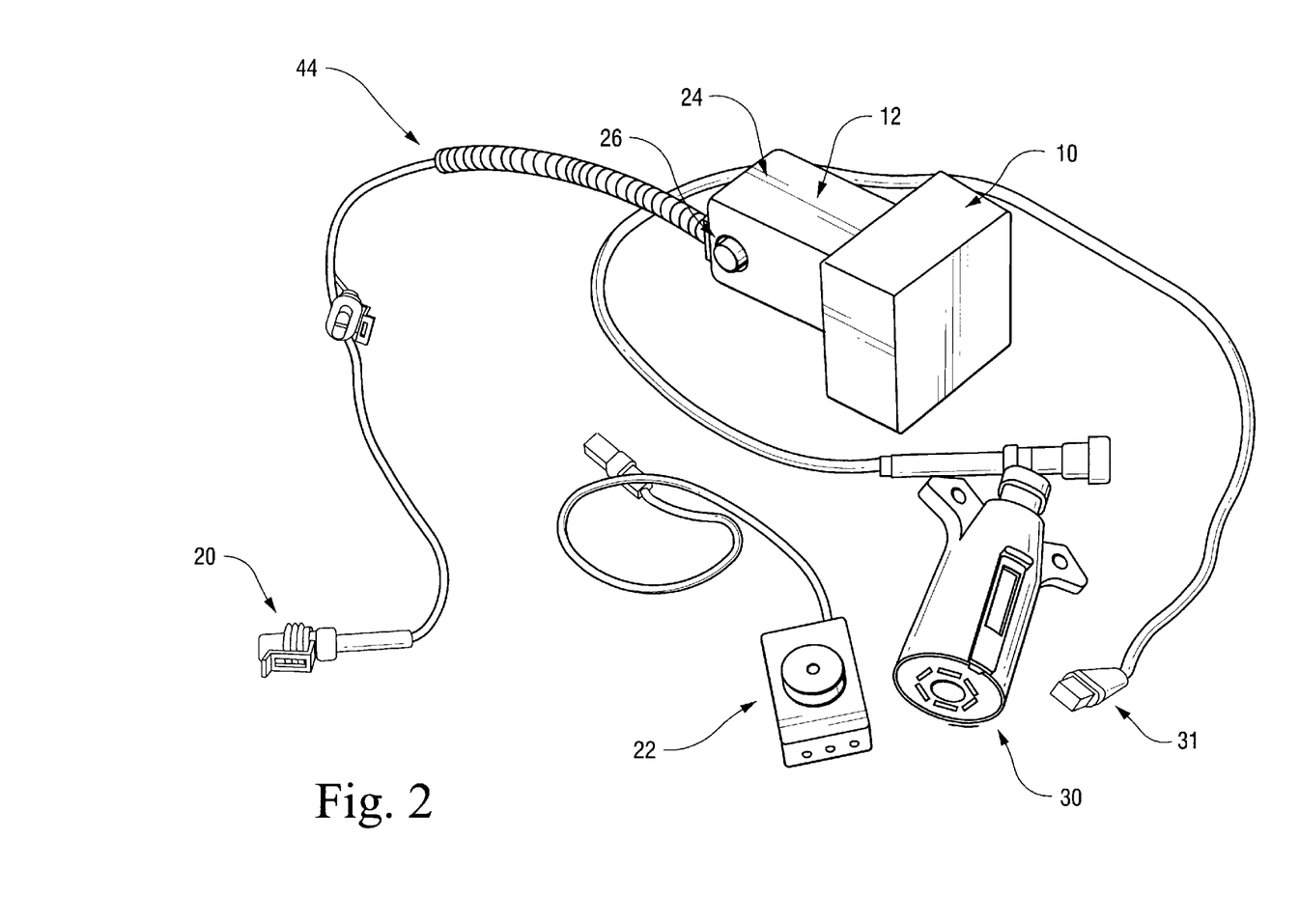
FIG. 2 is a perspective view of the components of the warning sensor system, where the components are not mounted on a vehicle.

FIG. 2 shows a perspective view of the components of the warning system 12. The warning system includes the sensor head 10, a sensor connector 30 that couples to a standard 7-pole RV connector socket, an audible alarm speaker 22, and electrical wiring 44 that connects these components together. The sensor head 10 includes the mounting bracket 24 that may be a rectangular post that is latched into the receiver by a locking pin 26. The post of the mounting bracket is a female connector that fits into an open aperture 28 (FIG. 1) of the trailer receiver 14. A visual display indicator 31 and a cable couples the display indicator to the wiring for the sensor 12. The visual display indicator is mounted in the passenger compartment of the vehicle and within eyesight of the driver. The visual indicator 31 and audio alarm 22 provide both visual and audio alarm signals to warn a driver backing up a vehicle that an object or person, such as a small child, is behind the vehicle.

Figure 3A:
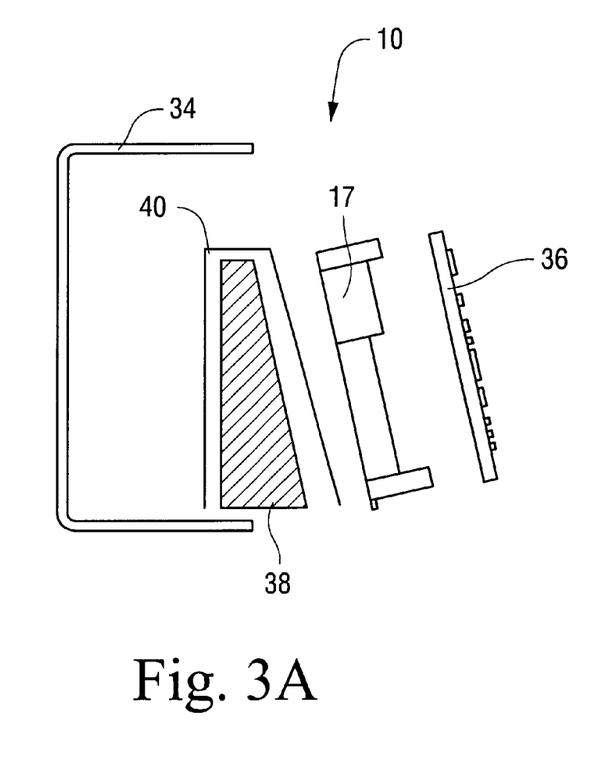
FIGS. 3A and 3B are side views in partial cross section showing the sensor head in exploded view (3B) and the head assembled (3A).
Figure 3B:
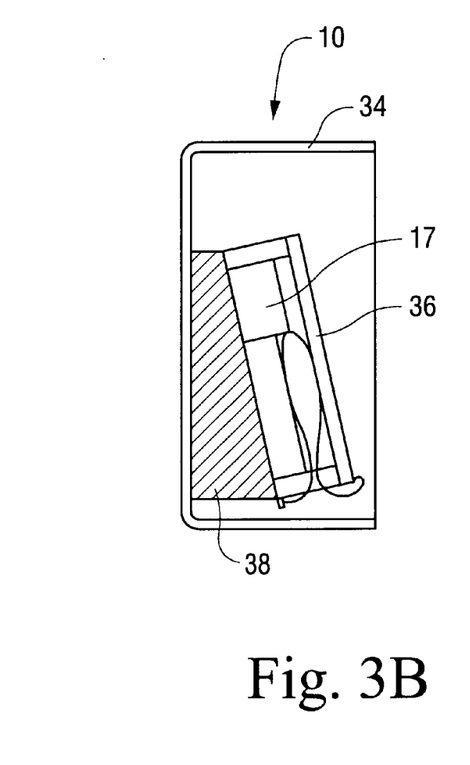

FIGS. 3A and 3B are schematic diagrams showing in partial cross-section the sensor head 10 in exploded view (FIG. 3A) and as assembled (FIG. 3B). is a diagram of the components of the warning system 12. The sensor head includes a slidable hood 34 that is a housing for the transceiver sensor 17 and an associated electronics board 36. The electronics board and transceiver sensor are mounted on a rigid foam platform 38, e.g., electrical potting material. The board and sensor may be arranged on the platform at a slight upward angle such that the sensing beam emitted by the transceiver is projected at the upward angle from the rear of the vehicle. The sensing beam should extend vertically from the ground behind the vehicle to a few feet above the ground. The foam platform 38 may be attached to the transceiver sensor 17 and board 36 by an adhesive tape 40. Similarly, the tape may be used to attach the platform to an interior surface of the hood 34. The foam platform should be relatively transparent to the sensing beam emitted and received by the transceiver sensor 17.

The transceiver sensor 17 may be a conventional transceiving radar sensor that emits electromagnetic radiation, in particular, radio or microwave frequency signals, and detects reflections of those signals as they are received at the sensor head 10. The front face of the radar transceiver is mounted on the platform 38 that is invisible to signals emitted by the transceiver. Similarly, the hood housing is invisible to signals emitted by the transceiver. Accordingly, signals emitted by the transceiver sensor propagate through the foam platform 38 and hood 34 to the rear of the vehicle. If an object is behind the vehicle, reflections from the emitted signals pass back through the housing and foam and are detected by the transceiver.

Figure 4A:
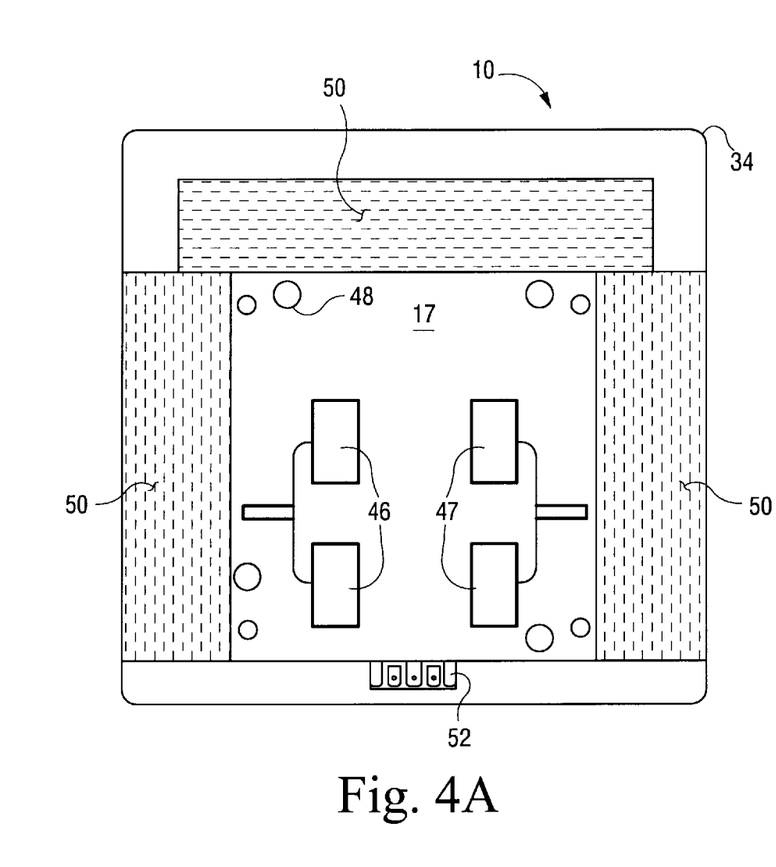
FIGS. 4A and 4B are plan view and a partial cross-sectional view, respectively, of the interior of the sensor head showing the sensor circuit boards and radar adsorbing material (RAM).
Figure 4B:
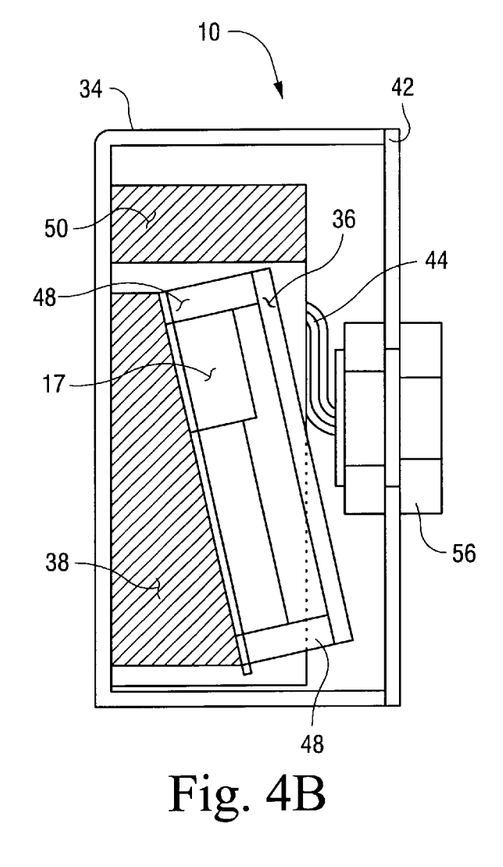

FIGS. 4A and 4B are schematic diagrams showing in plan view and a side view, in partial cross-section, the sensor head 10. The hood 34 slides onto a mounting plate 42 that attaches to the mounting bracket 24. This plate supports the hood and thereby supports the transceiver sensor 17 and associated electronic circuit board 36. The transceiver sensor may be arranged on a printed circuit board (see FIG. 4A) in plan view and include a plurality of antenna elements 46 that emit and/or receive the sensing beam. The board for the transceiver sensor is assembled with the electronics board 36, such as by bolts and column supports 48 that mount the electronics board behind the board for the transceiver sensor. The assembly of the transceiver sensor and electronics board may be mounted on the foam platform 38.

Radar adsorbing material (RAM) 50 is packed around the sides of the transceiver sensor 17 so as to minimize side lobes of the sensing beam that extend to the sides of the vehicle. In this way, the RAM shapes the sensing beam to direct the beam rearward of the vehicle. The RAM may be blocks arranged at the sides and above of the transceiver sensor.

The RAM shapes the signal pattern of the transceiver/transducer 17 to limit the area behind the vehicle in which objects are sensed to the area directly behind the vehicle and substantially within the width of the vehicle. For example, the sense pattern of the transducer may extend one foot beyond each side of the width of the vehicle. The sense pattern is the area behind the vehicle within which objects are sensed by the sensing head. The RAM is packed around the transceiver sensor 17 to reduce the sensitivity of the sensor with respect to the width and/or height of the vehicle. The RAM attenuates the signal side lobes of the radar head that emanate sideways and vertically beyond the width and height of the vehicle.

The RAM may attenuate the signal intensity from the radar head by, for example, 24 dB per inch of thickness of the material. A one-half inch thick section of RAM material 62, which would attenuate a radar signal by 12 dB, may be sufficient to surround the transceiver sensor 17 and properly attenuate the emitted signal. The amount of RAM and its arrangement around the transducer head will depend on the particular design of the sensor mount. The transceiver sensor 17 may comprise a pair of signal emission heads 46 and a complementary pair of signal receiving heads 47. Both of these signal emitting and receiving heads 46, 47 are bordered by the RAM. The RAM material attenuates both the emission of radar signals emitted from the transmitting head 46 and reflected signals being detected by receiving head 47. The signals which are sensed by the receiving head 68 are those which emanate substantially directly rearwardly of the vehicle and are reflected from objects that are immediately behind the vehicle or substantially behind the vehicle, such as either immediately behind the vehicle or within one foot of either side of the vehicle.

Radar adsorbing material (RAM) may have a foam like consistency that is easily cut and shaped to provide the appropriate attenuation of the signal emitted and sensed by the radar transceiver. RAM material is available from a variety of sources, such as from the Cuming Microwave Company, which sells and markets a CRAM FAC 24 (WWW-2 RAM material suitable for use in the present application).

Wiring 44 provides electrical connections between the electronics board 36 and the vehicle electrical system, in order to provide electrical power to the sensor head and to provide an electrical signal of a reverse gear selection in the vehicle. For example, the vehicle wiring system may apply power to reverse light and to a terminal of an electrical socket in a trailer hitch, when reverse gear is selected on the vehicle. The wiring 44 may provide that reverse gear power signal to the power contact 52 on the electronics board 36, and thereby activate the sensor head. The electronics board may also include a ground contact (GND) and a signal contact 54 through which signals are sent to the visual and audio alarms, when the sensor head detects a person or object behind the vehicle.

Figure 5:
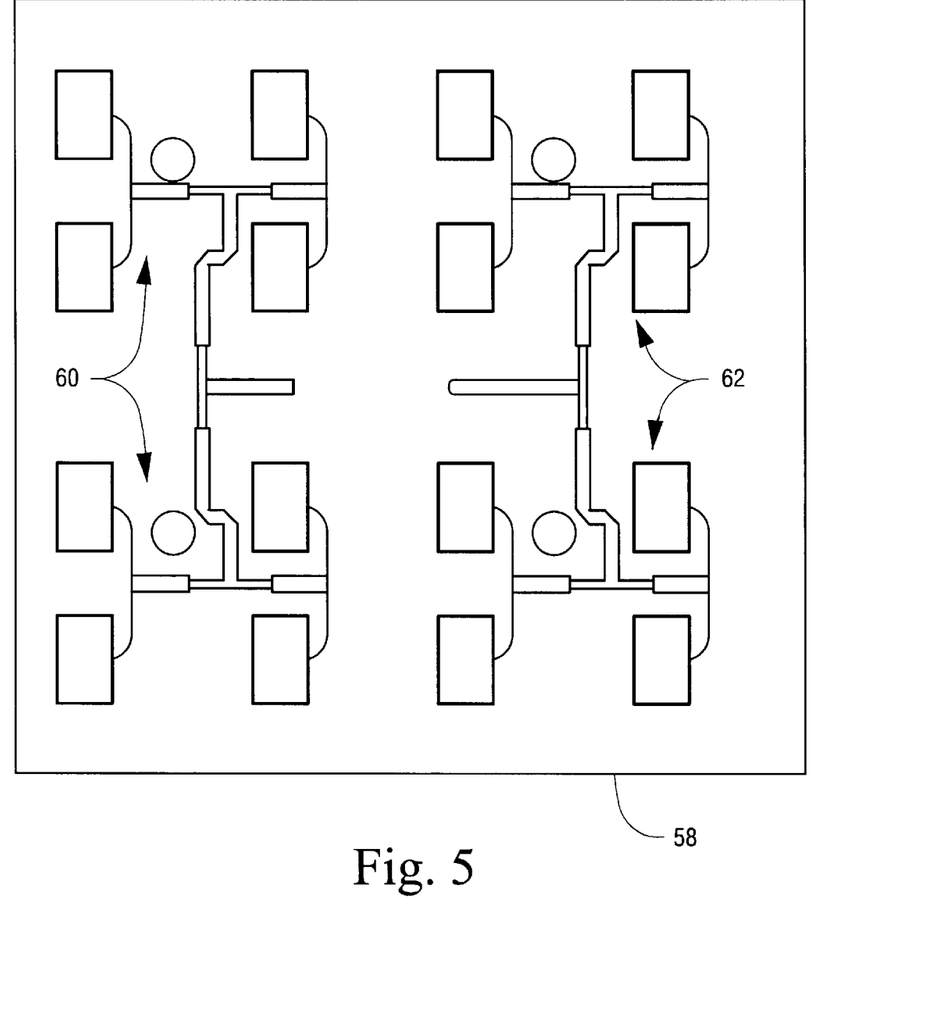
FIG. 5 is a plan-view diagram of a multiple-sensor antenna element.

FIG. 5 shows a second embodiment of the printed circuit board 58 for the transceiver sensor. This embodiment has a plurality of signal emission elements 60 and a plurality of signal sensing elements 62.

Figure 6A:
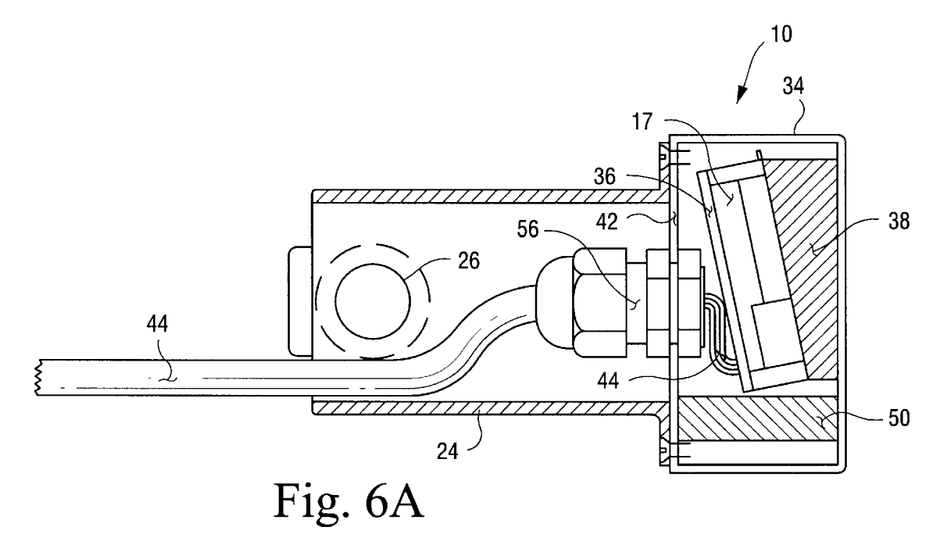
FIGS. 6A and 6B are enlarged cross-sectional side views of a portion of the sensor mount configured in the first embodiment (6A) and in the second embodiment (6B).
Figure 6B:
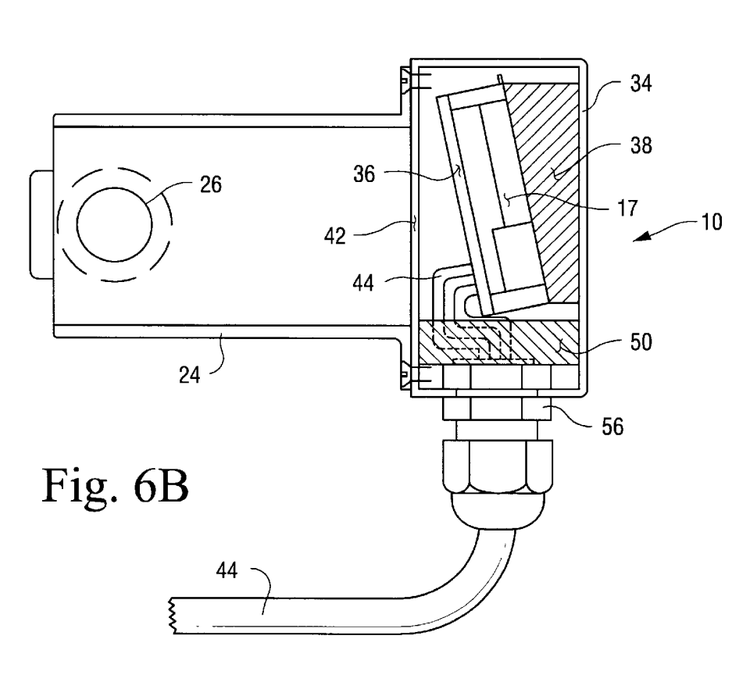

FIGS. 6A and 6B show a first and second embodiments of a sensor head 10 that is mounted on a mounting bracket 24. The embodiments of the sensor head vary with respect to the placement of the wiring grommet 56, through which extends wiring from the electronics board 36 and the vehicle wiring system. In the first embodiment (FIG. 6A), the grommet is in the mounting plate 42 such that the wiring extends into and through the channel of the mounting bracket 24 and the trailer receiver to connections with the vehicle electrical system and to the visual and audible alarms. In the second embodiment (FIG. 6B), the grommet 56 is on the side of the sensor head 10. The wiring 44 exits the sensor head externally of the trailer receiver.

The mounting bracket 24 includes a hollow metallic channel that is square (or rectangular) in cross section and is sized to fit in the aperture 28 of the receiver 14 of the trailer hitch. The mounting bracket includes a locking pin opening 26 through which a locking pin is inserted after the mounting bracket 20 has been inserted into the receiver 14. The locking pin secures the sensor head and mount in the receiver.

Figure 7A:
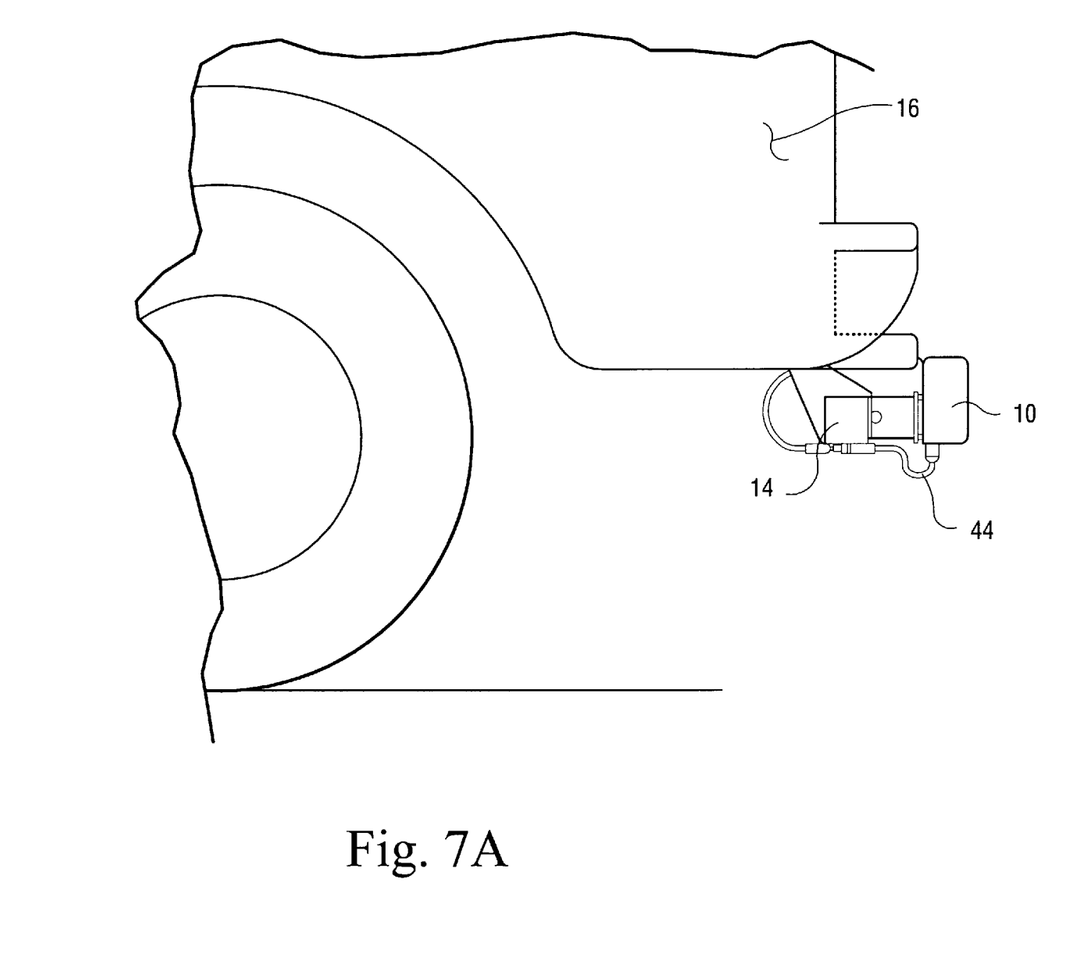
FIGS. 7A and 7B are side-view diagrams showing the sensor mounted on a vehicle (7A), and a partial cross-sectional view of a sensor installed in a trailer receiver.
Figure 7B:
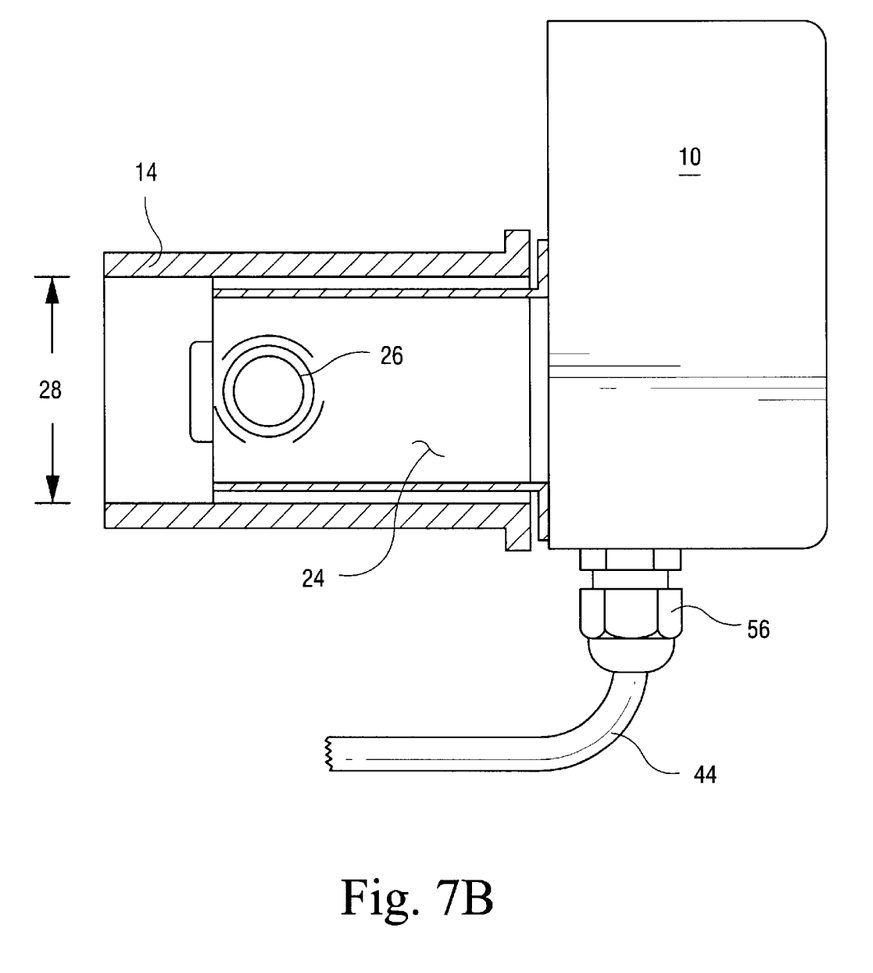

FIGS. 7A and 7B are a side view the sensor head 10 mounted on a vehicle 16 (FIG. 7A) and a close-up side view (FIG. 7B) of the sensor head 10 inserted into a receiver 14 of a trailer hitch. The mounting plate slides into the aperture 28 of the receiver and is locked in place by a locking pin (not shown). The wiring 44 extends from the side of the sensor head and is coupled to the wiring system of the vehicle. To remove the sensor head, the locking pin is removed and the head and mounting bracket are slide out of the trailer receiver and the wiring disconnected from the vehicle. The trailer hitch is then ready to receive a trailer ball.

Figure 8:
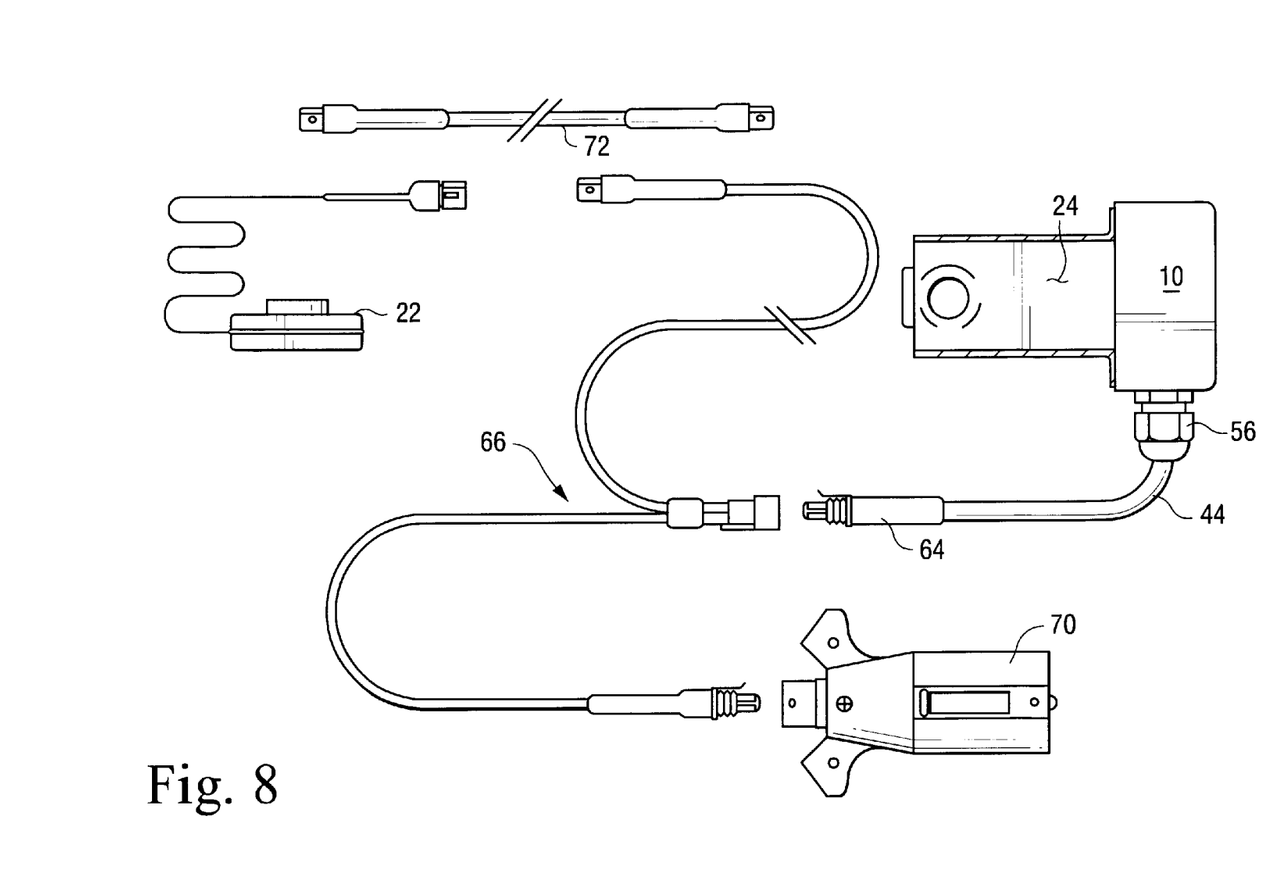
FIG. 8 is a schematic diagram showing a first embodiment of the sensor mount with electrical wires and connectors.
Figure 9:
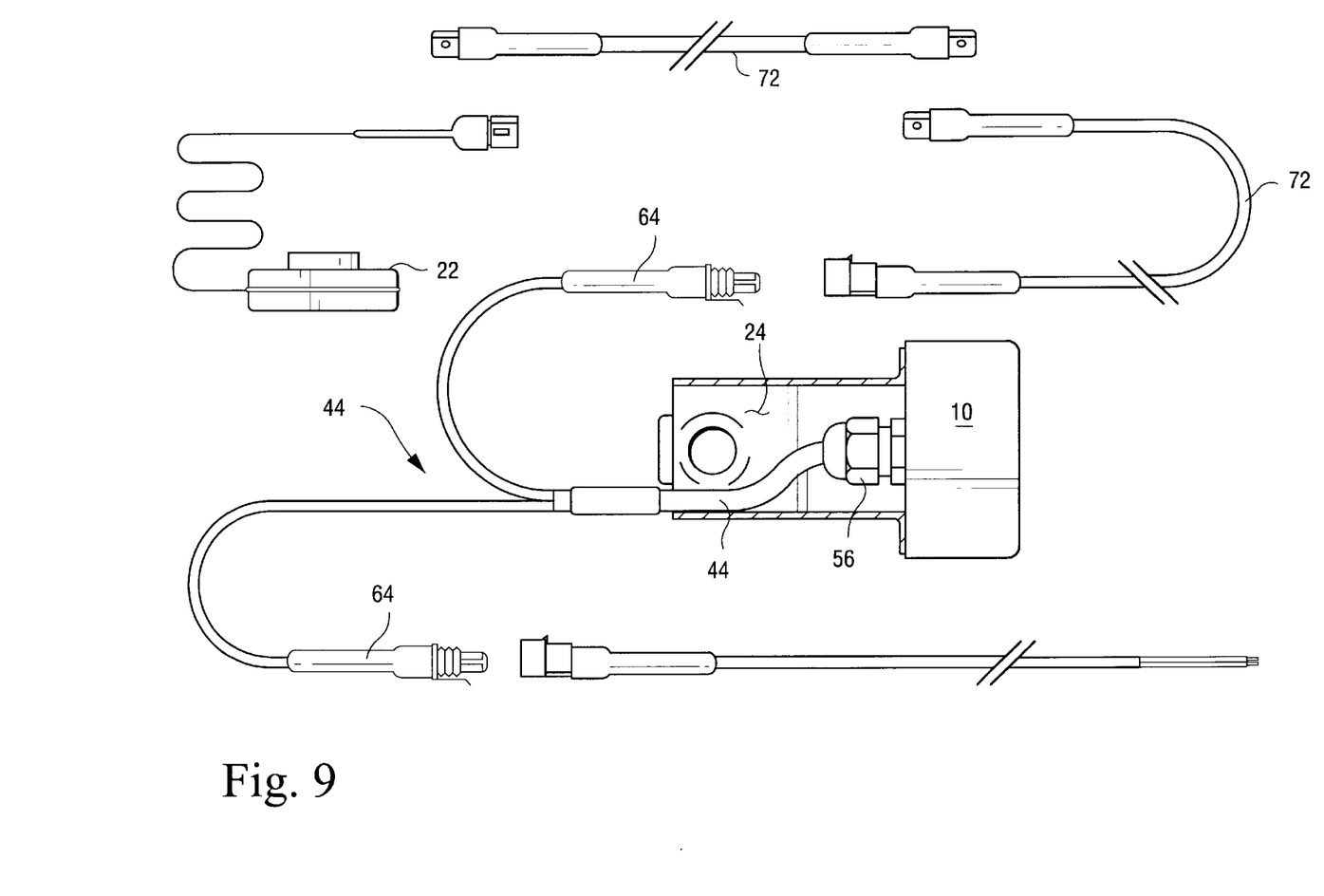
FIG. 9 is a schematic diagram showing a second embodiment of the sensor mount with electrical wires and connectors.

As shown in FIG. 8, the wiring 44 from sensor head 10 include a connector 64 to couple to a wiring system 66 that connects to a standard seven-blade plug 70 that fits into the electrical connection for a trailer hitch. The wiring system 66 also extends to extension wires 72 for the audio alarm 22 and/or visual indicator. Similarly, FIG. 9 shows the wiring 44 extending from the end of the mounting bracket (and trailer receiver) to a connector 64 that couples to another connector that is wired to the reverse light wires of the vehicle electrical system. In addition, multiple extension wires 72 may be used to connect the audio alarm 22 and/or visual indicator to the sensor head.

While the invention has been described in connection with what I believe are the most practical and preferred example embodiments, other variations are possible. The invention is intended to cover all such variations and alternatives as limited only by the scope of the claims.

What is claimed is:

1. A warning sensor system for a vehicle comprising:
   a sensor head mountable in an aperture of a trailer receiver attached to a rear of the vehicle and from which receiver a trailer ball mount is absent, wherein said sensor head includes a transceiver emitting wireless signals rearwardly of the vehicle and detecting echoes from the signals reflected from an object behind the vehicle;
   an electrical coupling connected to the sensor head and connectable to a matching coupling on said receiver; and
   an alarm device mounted in a passenger compartment of said vehicle and electrically connected to said sensor head,
   wherein said sensor transceiver includes a mounting post which inserts into the aperture of the receiver, a plate mounted on an end of the mounting post and a hood, and the post, plate and hood are slidably engaged with the receiver, wherein the transceiver further includes an electronics board mounted on said plate and said hood provides a portion of the outer housing for the transceiver.

2. The sensor system of claim 1 wherein the sensor transceiver is bordered by radar adsorbing material (RAM).

3. The sensor system of claim 1 wherein said receiver includes an aperture facing rearwardly of the vehicle.

4. The sensor system of claim 1 wherein said sensor head has a rearward face substantially flat and having a vertical orientation.

5. The sensor system of claim 1 wherein said sensor head has a rearward face substantially flat and having a vertical orientation.

6. The sensor system of claim 1 wherein the transceiver is tilted with respect to a vertical plan to rearwardly and upwardly project a beam behind the vehicle.

7. The sensor system of claim 1 wherein the electrical coupling plugs into a standard electrical socket for a trailer hitch.

* * * * *